(12) United States Patent
Vaittinen et al.

(10) Patent No.: US 7,016,342 B2
(45) Date of Patent: Mar. 21, 2006

(54) ENHANCEMENT OF DUAL TRANSFER MODE WHEN CIRCUIT SWITCHED RESOURCES ARE RELEASED

(75) Inventors: Rami Vaittinen, Littoinen (FI); Antti O. Kangas, Oulunsalo (FI)

(73) Assignee: Nokia Corporation, Espoo (FI)

( * ) Notice: Subject to any disclaimer, the term of this patent is extended or adjusted under 35 U.S.C. 154(b) by 145 days.

(21) Appl. No.: 10/763,936

(22) Filed: Jan. 23, 2004

(65) Prior Publication Data

US 2005/0163106 A1 Jul. 28, 2005

(51) Int. Cl.
*H04L 12/66* (2006.01)
(52) U.S. Cl. .................. 370/352; 370/338; 370/356
(58) Field of Classification Search ........ 370/351–356, 370/338, 349, 328, 331, 332; 455/422.1, 455/436, 437–444, 127.4
See application file for complete search history.

(56) References Cited

U.S. PATENT DOCUMENTS

| | | | | |
|---|---|---|---|---|
| 2003/0169725 A1 * | 9/2003 | Ahmavaara et al. | ........ | 370/352 |
| 2004/0184439 A1 * | 9/2004 | Blanc et al. | ................ | 370/349 |
| 2004/0248615 A1 * | 12/2004 | Purkayastha et al. | .... | 455/552.1 |

OTHER PUBLICATIONS

3GPP TS 23-060 v6.3.0 (Dec. 2003); Technical Specification Group Services and System Aspects; General Packet Radio Service (GPRS); Service Description; Stage 2 (Release 6).

3GPP TS 45.008 v6.5.0 (Nov. 2003); Technical Specification Group GSM/EDGE; Radio Access Network; Radio Subsystem Link Control (Release 6).

3GPP TS 44.060 v6.5.0 (Dec. 2003); Mobile Station (MS)—Base Station System (BSS) Interface; Radio Link Control/Medium Access Control (RLC/MAC) Protocol (Release 6).

3GPP TS 44.018 v6.5.0 (Dec. 2003); Mobile Radio Interface Layer 3 Specification; Radio Resource Control (RRC) Protocol (Release 6).

3GPP TS 43.064 v6.1.0 (Aug. 2003); General Packet Radio Service (GPRS); Overall Description of the GPRS Radio Interface; Stage 2 (Release 6).

* cited by examiner

*Primary Examiner*—Ajit Patel

(57) ABSTRACT

A method and mobile terminal are disclosed for use in a wireless communication system in order for the mobile terminal to be able to transition from a dual mode, in which a packet switched connection and circuit switched connection are used together, to a single mode in which packets are transferred. The mobile terminal is for receiving minimum system information necessary to perform the transition in an uninterrupted manner, instead of an interrupted manner. This system information is broadcast to the mobile terminal on a regular basis, and is also sent to the mobile terminal partly or entirely by point-to-point transfer if a piece of the minimum system information is missing due to inadequate broadcast reception or some other reason. This system information is then employed by the mobile terminal to transition from the dual mode to the single mode in the uninterrupted manner.

28 Claims, 5 Drawing Sheets

ENHANCEMENT OF DUAL TRANSFER MODE WHEN CIRCUIT SWITCHED RESOURCES ARE RELEASED

FIELD OF THE INVENTION

The present invention relates to wireless communication, and more particularly to packet switching and circuit switching for wirelessly communicating with a mobile terminal.

BACKGROUND OF THE INVENTION

The first Global System for Mobile (GSM) communication networks were designed for voice services rather than for data services. When the use of GSM data services started, it soon became evident that the Circuit Switched (CS) bearer services were not well-suited for certain types of applications with a bursty nature. Therefore the new Packet Switched (PS) data transmission service GPRS (General Packet Radio Service) was developed for packet services. GPRS is a packet radio network utilizing the GSM network, and GPRS endeavours to optimize data packet transmission by means of GPRS protocol layers on the air interface between a mobile station (hereinafter also called a mobile terminal) and a GPRS network.

A GPRS mobile station (MS) can operate in one of three modes of operation, as described in 3GPP TS 23.060, "Service description; Stage 2," Section 5.4.5. The three modes are Class-A Mode, Class-B Mode, and Class-C Mode. According to the Class-A mode of operation, the MS is attached to both GPRS as well as other GSM services, and therefore Class-A Mode corresponds to Dual Transfer Mode (DTM) Mode (hereinafter also called dual mode). The mobile user in Class-A Mode can make and/or receive calls on the two services simultaneously, for example having a normal GSM voice call and receiving GPRS data packets at the same time. According to the Class B mode of operation, the MS is attached to both GPRS and other GSM services, but the MS can only operate one set of services at a time. According to the Class C mode of operation, the MS can only be attached either to the GSM network or the GPRS network; the selection is done manually and there are no simultaneous operations.

Based on the current standard (3GPP TS 44.018, "Radio Resource Control Protocol"), when the MS releases a CS connection (also referred to as a radio resource or RR connection) while in the Dual Transfer Mode (DTM), all packet resources are aborted. This is illustrated in FIG. 1 (also see 3GPP TS 43.064, "Overall description of the GPRS radio interface; Stage 2"), which shows shows RR operating modes and transitions between Class-A (DTM supported) and Class-B. An RR Release moves the MS from the Dual Transfer Mode 102 into an Idle/Packet Idle state 104, after which the MS must then obtain packet access in order to perform packet transfer. In other words, after the release of the CS connection, the MS is in the packet idle mode and must perform a complete acquisition of system information and ask for PS resources again, in order to get into the Packet Transfer Mode 106.

FIG. 2 further illustrates how the system is currently working, according to the prior art. The four vertical lines represent portions or stages of the network. The line 202 represents the mobile station (MS), the line 204 represents the base station system (BSS), the line 206 represents the serving GPRS support node (SGSN), and the line 208 represents the mobile switching center (MSC). FIG. 2 shows that initially a packet switched session 210 and a circuit switched session 212 are in progress according to the dual mode. Then, either the MS or the network can initiate a disconnect of the CS connection, which causes the circuit switched call to be released at call control level and subsequently the channel is released.

In FIG. 2, the difference between the "release" and the subsequent "channel release" is as follows. The "RELEASE" message is a GSM Call Control protocol message, which merely releases the circuit-switched call at the Call Control level. Note that this message exchange (RELEASE, RELEASE COMPLETE) does not occur with all dedicated connections, such as Short Message Service (SMS) or MM Location Update. Regarding the 'CHANNEL RELEASE' message in FIG. 2, that is a GSM Radio Resource protocol message which indicates that the Radio Resource (i.e. channel) is being released, after which the MS returns to (packet) idle mode according to FIG. 2. Thus, the two 'release' messages belong to different protocol entities. In FIG. 2, the MS initiates the disconnect of the CS connection, and the MS then transfers to the packet idle state 214 from which the MS must perform a complete acquisition of system information in order to get back into a packet switched session 216.

If the network supports a Packet Broadcast Control Channel (PBCCH), then the MS will not perform packet access or enter the packet transfer mode 216 until it has acquired the PACKET SYSTEM INFORMATION TYPE 1 (PSI1) message, and acquired a consistent set of PSI2 messages, and also made at least one attempt to receive the complete set of PSI messages on PBCCH. See 3GPP TS 44.060, "Radio Link Control/Medium Access Control (RLC/MAC) protocol."

If the network supports the PACKET PSI STATUS message, the mobile station may perform packet access, and enter packet transfer mode 216, as soon as the PSI1 message and a consistent set of PSI2 messages have been received.

On the other hand, if the PBCCH is not present in the network, then the MS must perform a complete acquisition of Broadcast Control Channel (BCCH) messages, in which case the mobile station will not perform packet access or enter the packet transfer mode 216 until it has acquired the SYSTEM INFORMATION TYPE 3 (SI3), SI13 and, if present, SI1 messages, and additionally has made at least one attempt to receive other SI messages that may be scheduled within one TC cycle on BCCH. TC is a formed mathematical expression of a GSM "multiframe modulo." The TC value is cyclic and runs from values 0 to 7 (i.e. the TC can have values TC=0, TC=1, TC=2, . . . TC7). One GSM multiframe (on BCCH/CCCH) consists of 51 TDMA frames, adding up to 51 times 60/13 ms which equals approximately 235 ms. Therefore, 8 multiframes (i.e. TC0 . . . TC7) adds up to approximately 1.8 seconds. The reason for quoting the TC value in the context of the present invention is to establish the significant delay experienced from the SYSTEM INFORMATION RECEPTION on the BCCH, in case the CS connection needs to be released before packet access is again possible for the MS (as is specified now according to the prior art).

If the network supports the PACKET SI STATUS message, the MS may perform packet access, and enter packet transfer mode, as soon as the SI3, SI13 and, if present, SI1 messages have been received.

The main problem with these prior art techniques is that the MS is not allowed to immediately enter the packet transfer mode 216 until it has performed various steps. Thus, the mobile station will be forced to idle its packet switching capabilities, while it sets up the packet switching session 216.

SUMMARY OF THE INVENTION

The present invention enhances the MS behaviour in the Class-A mode of operation, in order to expedite a transition to Class-B mode. One way to accelerate the radio resource (RR) mode transition from the dual transfer mode (Class-A) to a packet transfer mode (Class-B) is to offer the minimum system information to continue packet transfer already occurring in the dual transfer mode, and then offering the rest of the system information while in packet transfer mode.

Accordingly, the present invention includes a method, mobile terminal, and system for use in a wireless communication system, in order for the mobile terminal to be able to transition from a dual transfer mode, in which a packet switched connection and circuit switched connection are used together, to a packet transfer mode in which packets are transferred. The mobile terminal is for receiving minimum system information necessary to perform the transition in an uninterrupted manner, instead of an interrupted manner. This information is broadcast to the mobile terminal on a regular basis, or is sent as needed by the mobile terminal, or both. This minimum system information is then employed by the mobile terminal to transition from the dual transfer mode to the packet transfer mode in the uninterrupted manner, unless the minimum system information is incomplete, in which case the transition from dual transfer mode is achieved in an interrupted manner. The present invention further includes a computer readable medium encoded with a software data structure sufficient for performing the present method.

This invention has the advantage that the MS can maintain PS resources and gain better quality of service for a packet application. Gaps in PS service are minimized, especially if the MS has not changed location area during the CS connection. This invention thus allows an RR operation mode to be changed directly from dual transfer mode to the packet transfer mode without the release of packet resources after the release of an RR connection.

According to an embodiment of the present invention, a minimum system information (SI) or packet system information (PSI) is sent to the mobile station by using a packet serving cell data message before a circuit-switched channel is released. Thus, the mobile station will be able to immediately transition from dual transfer mode to packet transfer mode without having to request a packet-switched channel or resources.

DETAILED DESCRIPTION OF THE INVENTION

Figure 1:
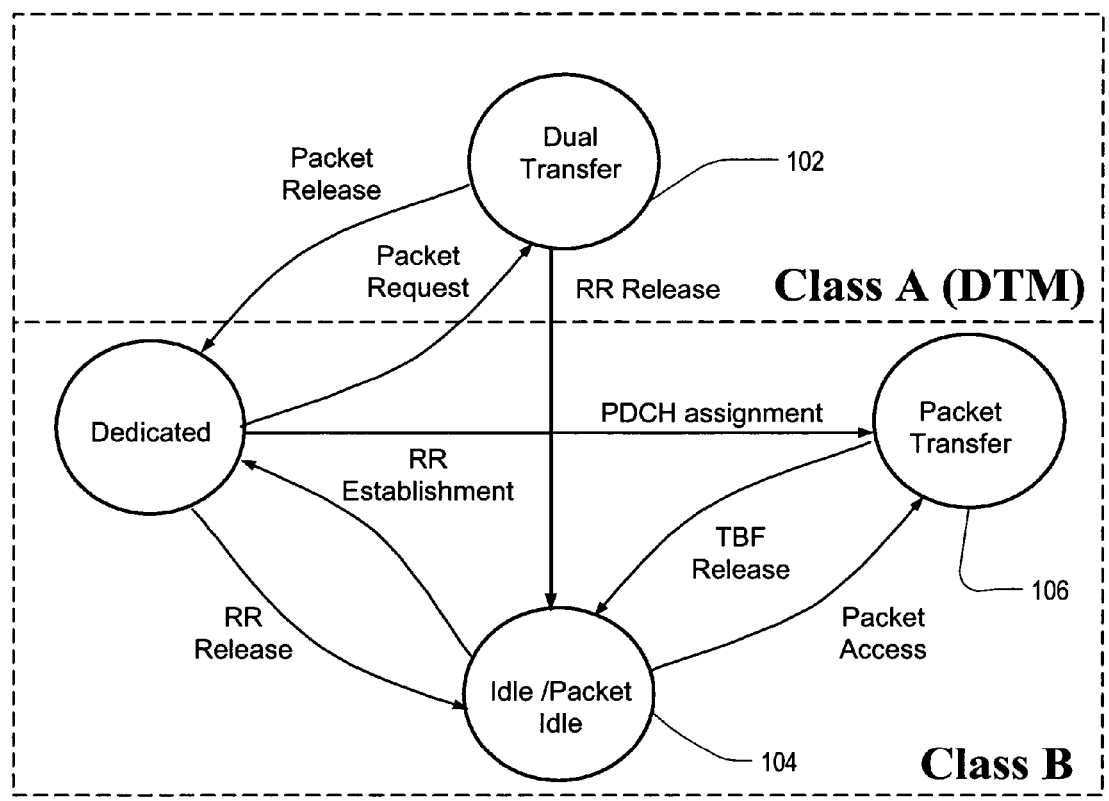
FIG. 1 shows how a mobile terminal transitions from dual transfer mode according to the prior art.
Figure 2:
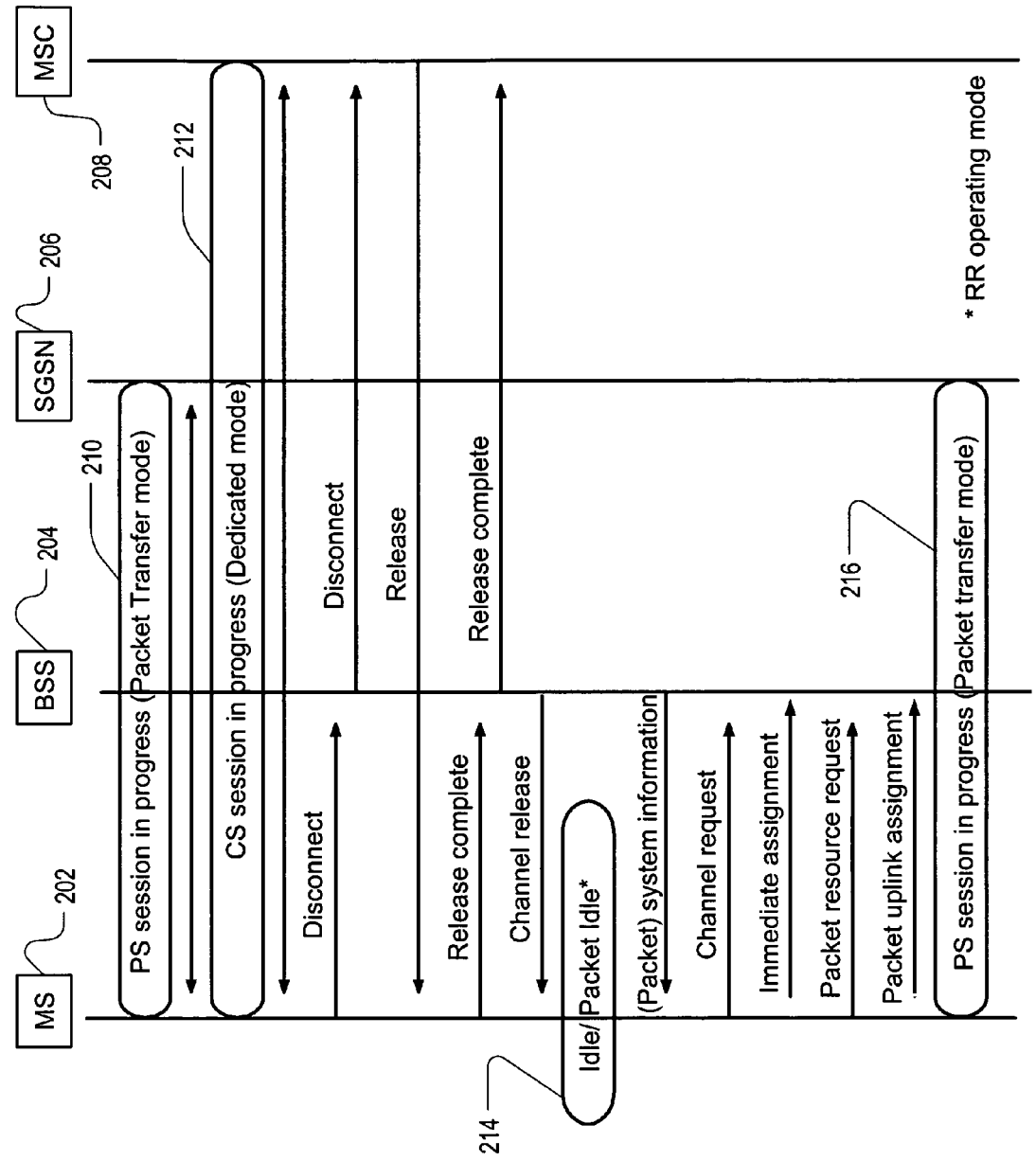
FIG. 2 details the transition from dual mode to packet mode according to the prior art.
Figure 3:
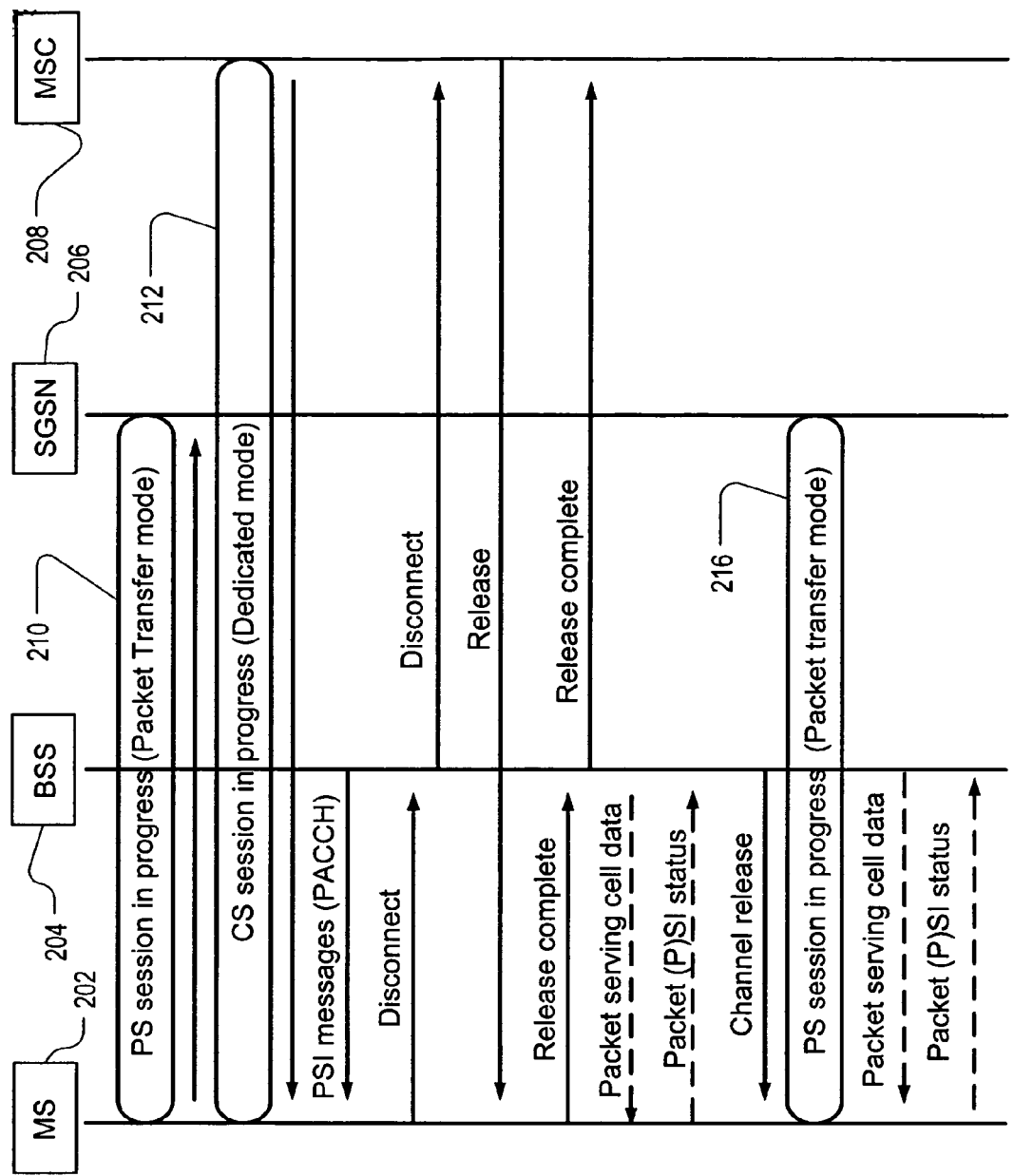
FIG. 3 details the transition from dual transfer mode to packet transfer mode according to the present invention.

The present invention describes a way to enhance the transition between two main situations: dual transfer mode, and packet transfer mode. Regarding action while in dual transfer mode, as mentioned previously, the MS obtains a certain set of system information depending on whether a packet control channel is supported or not by the network, in order to continue without a service gap in the packet transfer mode, after an RR connection is released. FIG. 3 depicts the enhanced transition from dual mode due to an RR connection release.

While in dual transfer mode the MS 202 may receive PSI messages on the packet associated control channel or PACCH (PBCCH exists on the cell). In 3GPP TS 44.060, "Radio Link Control/Medium Access Control (RLC/MAC) protocol," it is specified that the MS shall check every 30 seconds whether the system information has been changed. This can also be a reasonable way for the MS to check for PSI messages received on the PACCH when in dual transfer mode. This means that the MS cannot use PSI messages received more than 30 seconds ago. Another potential drawback is that, because PSI messages are distribution messages (intended for all mobiles), the network cannot confirm that the MS has received the PSI message via the RLC/MAC polling mechanism.

When an RR connection is released and the needed system information is missing or is not received by the MS 202 within 30 seconds, the base station 204 may send system information before releasing the CS resources. The base station would know to send this information because the network has not received an acknowledgment from the MS confirming that the MS has all of the minimum system information necessary for the uninterrupted transition to the packet switch mode. If packet control channels are supported, then a network may send PSI1 and a consistent set of PSI2 messages when the MS is in the dual transfer mode. If packet control channels are not supported then a network may send SI3, SI13 and, if present, SI1 messages when the MS is in the dual transfer mode. In either case, the intent is to provide the MS with the minimum system information necessary to make the transition from dual transfer mode to packet transfer mode.

A network can send these messages by using a PACKET SERVING CELL DATA message on the Packet Associated Control Channel (PACCH). The MS can use a PACKET (P)SI STATUS message to indicate (e.g. acknowledge) which messages it has received correctly. This exchange of signal is presented in FIG. 3 with dotted arrows before the CHANNEL RELEASE message. The reason these arrows are dotted is because the MS will not need to receive such a message if an adequate PSI message was received by the MS.

The network will send the needed system information before the release of an RR channel. The CHANNEL RELEASE message is sent after the MS acknowledges that it has received correctly all needed system information. The PACKET (P)SI STATUS message can be used to acknowledge the receipt of system information. Currently in the PACKET SI STATUS message the MS can indicate that it has received SI1 and SI3 messages from the required set to make packet access (i.e the MS cannot indicate the receipt of the SI13 message). When packet control channels are supported and the PACKET PSI STATUS message is used, the MS can indicate that it has received a consistent set of PSI2 messages within the required set to make the uninterrupted transition to the packet transfer mode (i.e. the MS cannot indicate the receipt of the PSI1 message). Because the MS can indicate neither SI13 nor PSI1 messages, a new field (e.g. BASIC_SET_RECEIVED: bit) is needed in both messages. The acknowledgment that the MS has received the basic set can also be done with the new RLC/MAC message.

If a network cannot send all needed information, or if it has insufficient resources, then the network can just send a CHANNEL RELEASE message with a notification that the MS is not allowed to continue in the packet transfer mode immediately after the release of the RR channel. In this case, after the release of the PS resources, the MS may ask for them again, as already specified in the prior art. Alternatively, the network will preferably indicate that the MS is allowed to continue in the packet transfer mode after the release of CS resources.

A timer is defined in the network for awaiting a response from the MS to the receipt of system information messages. In case no response is received by the network (i.e. the timer expires), the network sends a CHANNEL RELEASE message with an indication that the MS is not allowed to continue in the packet transfer mode after release of an RR connection. The value of the timer shall be set so that network resources are not wasted too long, for example if the MS has only DL Temporary Block Flow (TBF) allocated, then the network shall wait until it is polled to send the PACKET DOWNLINK ACK/NACK message.

Regarding action while in packet transfer mode, when an RR connection has been released then a network may allocate TBFs with normal prior art procedures, for example by using a PACKET TIMESLOT RECONFIGURE message.

If the MS, while in dual transfer mode, has had only PDTCH/F (Packet Data Traffic Channel/Full rate), then power control parameters apply in the packet transfer mode too. Alternatively, if the MS, while in dual transfer mode, has had in some timeslots a PDTCH/H and TCH/H (Traffic Channel/Half rate) configuration in the downlink, then the MS also releases PDTCH/H when an RR connection is released.

Delivery of system information works as already specified in 3GPP TS 44.060, "Radio Link Control/Medium Access Control (RLC/MAC) protocol," with the PACKET PSI STATUS or PACKET SI STATUS procedure. Packet measurements operate as currently specified in 3GPP TS 44.060 and 3GPP TS 45.008, "Radio subsystem link control." Likewise, timing advance will operate as currently specified in 3GPP TS 44.060.

The present invention also addresses various mobility scenarios for action while in packet transfer mode. During a dual transfer mode the location of the MS may change. Cell, location area (LA), and routing area (RA) changes are all possible. The behavior of the MS also depends upon on the Network Operation Mode (NMO) of the network. This present invention therefore addresses different possible scenarios that are relevant when the RR connection is released.

For an MS that changes RA during dedicated connection and NMOII or NMOIII is used, a normal Routing Area Update (RAU) is made during DTM, and when an RR connection is released the MS may continue in a packet transfer mode without any interruption. For an MS that changes LA or RA during a dedicated connection, and NMOI (instead of NMOII or NMOIII) is used, the MS makes a RAU when the handover is completed, and when an RR connection is released the MS makes a Combined RAU procedure. This can be done via normal uplink Temporary Block Flow (TBF) resource allocation. If the RAU is not completed before a RR connection is released, the MS's behavior is FFS because when a RR connection is released the MS shall immediately start combined RAU. It would be easier just to release a TBF in this special case. If the MS has made the RAU, and user data transfer is already ongoing when CS resources are released, the MS is not allowed based on the current standard to send user data while combined RAU is in progress. The described case is very problematic if RLC is working in unacknowledged mode because combined RAU shall be done with RLC acknowledge mode. In this case a TBF shall be released. Another possibility would be to add to the PACKET (P)SI STATUS message or to the new message a new field (for example, CS_PROCEDURE_PENDING: bit) meaning that the combined RAU will happen when a CS connection ends. When a network receives a message with this notification it knows that both CS and PS resources can be released when an RR connection ends, without awaiting the expiry of the timer.

For an MS that changes LA during a dedicated connection in NMOII, or NMOIII or NMO is changed from NMOI to NMOII, the MS makes RAU when handover is completed, and when an RR connection is released the MS performs a Location Area Update (LAU) procedure. This can be done according to the usual method wherein the MS releases packet resources and starts the random access procedure (i.e. normal PS≧CS change). Another possibility would be to add to the PACKET (P)SI STATUS message or to the new message the new field (e.g. CS_PROCEDURE_PENDING: bit), and the LAU will happen when a CS connection ends. When a network receives a message with this notification, it knows that both CS and PS resources can be released when an RR connection ends, without awaiting the expiry of the timer.

Figure 4:
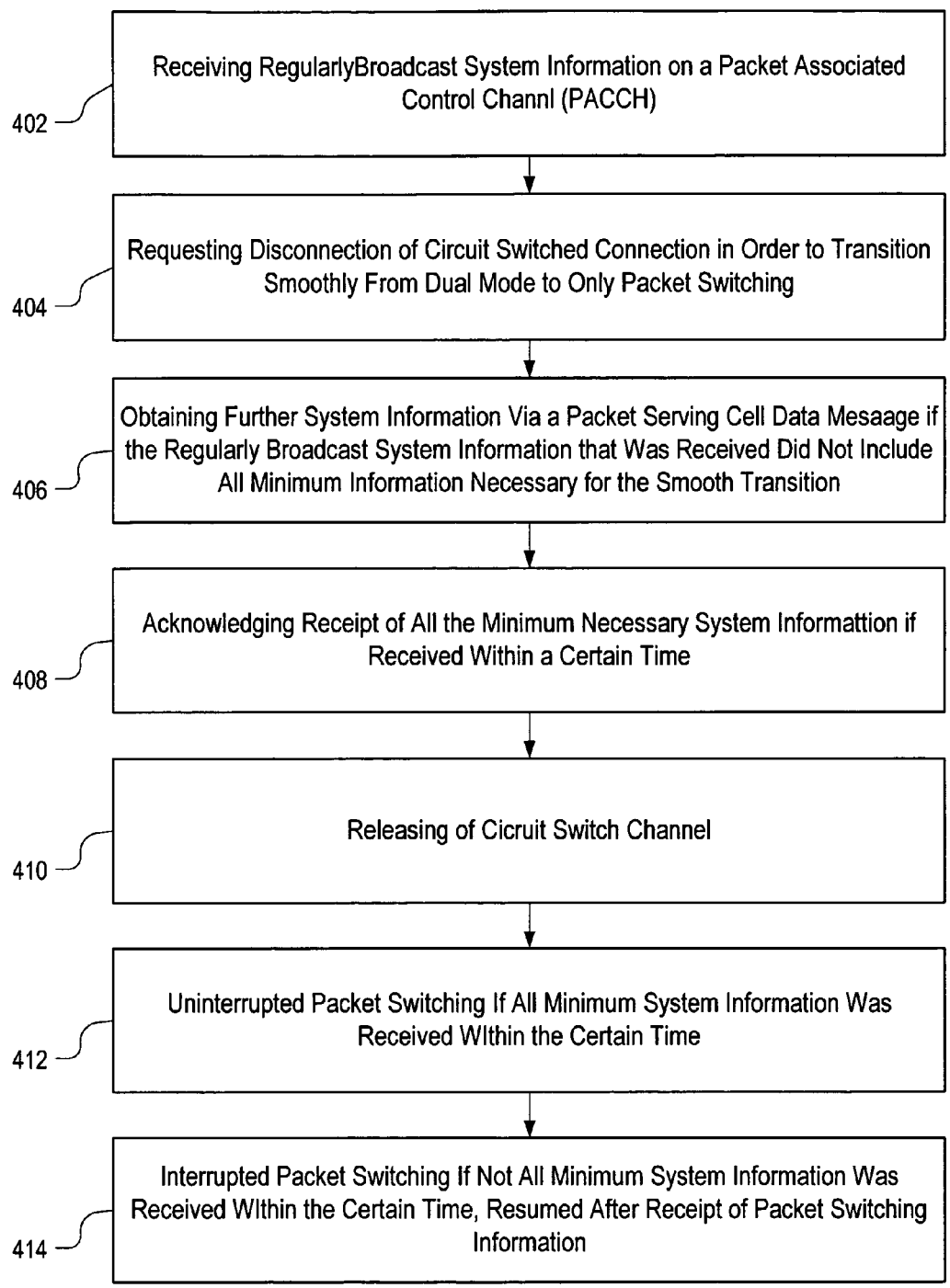
FIG. 4 is a flow chart of a method according to an embodiment of the present invention.

Referring now to the flowchart of FIG. 4, this illustrates a method according to a best mode embodiment of the present invention. This method is for a mobile terminal to transition from a dual transfer mode, in which a packet switched connection and circuit switched connection are used together, to a packet transfer mode in which packets are transferred. In the step 402, at least minimum system information is received that is necessary to perform the transition in an uninterrupted manner. In this step 402, the information is broadcast on a regular basis to the mobile terminal. The transition from dual transfer mode is made when the circuit switching channel is released 410, at which point the information is employed to transition from the dual transfer mode to the packet transfer mode in the uninterrupted manner 412, if the information includes all of the minimum information; if all of the minimum information is not included, then the transitioning to the packet transfer mode occurs in an interrupted manner 414. The dual transfer mode corresponds to a Class-A mode, and the packet transfer mode corresponds to a Class-B mode. Alternatively, the single mode may correspond to a Class-C mode.

In addition to the broadcast system information received in step 402, further information necessary for an uninterrupted transition may be received during step 406 in the form of a system information message, if the broadcast system information was not completely received or was insufficient for the uninterrupted transition. In this embodiment, the system information message includes a packet system information message sent to the mobile terminal via a packet associated control channel (PACCH), and this packet system information message is sent after initiating or requesting disconnection 404 of the packet channel but before the channel is actually released 410.

In step 408, an acknowledgment is sent from the mobile terminal that all of the minimum information was obtained, and the circuit switched channel is released 410 after the acknowledgment is received, or if the acknowledgment is not received by a certain time in which case the transition is performed in the interrupted manner 414. The interrupted manner 414 includes (and the uninterrupted manner excludes) the usual prior art steps of requesting a channel, having a channel assigned, asking for a packet resource, and obtaining a packet uplink assignment.

Figure 5:
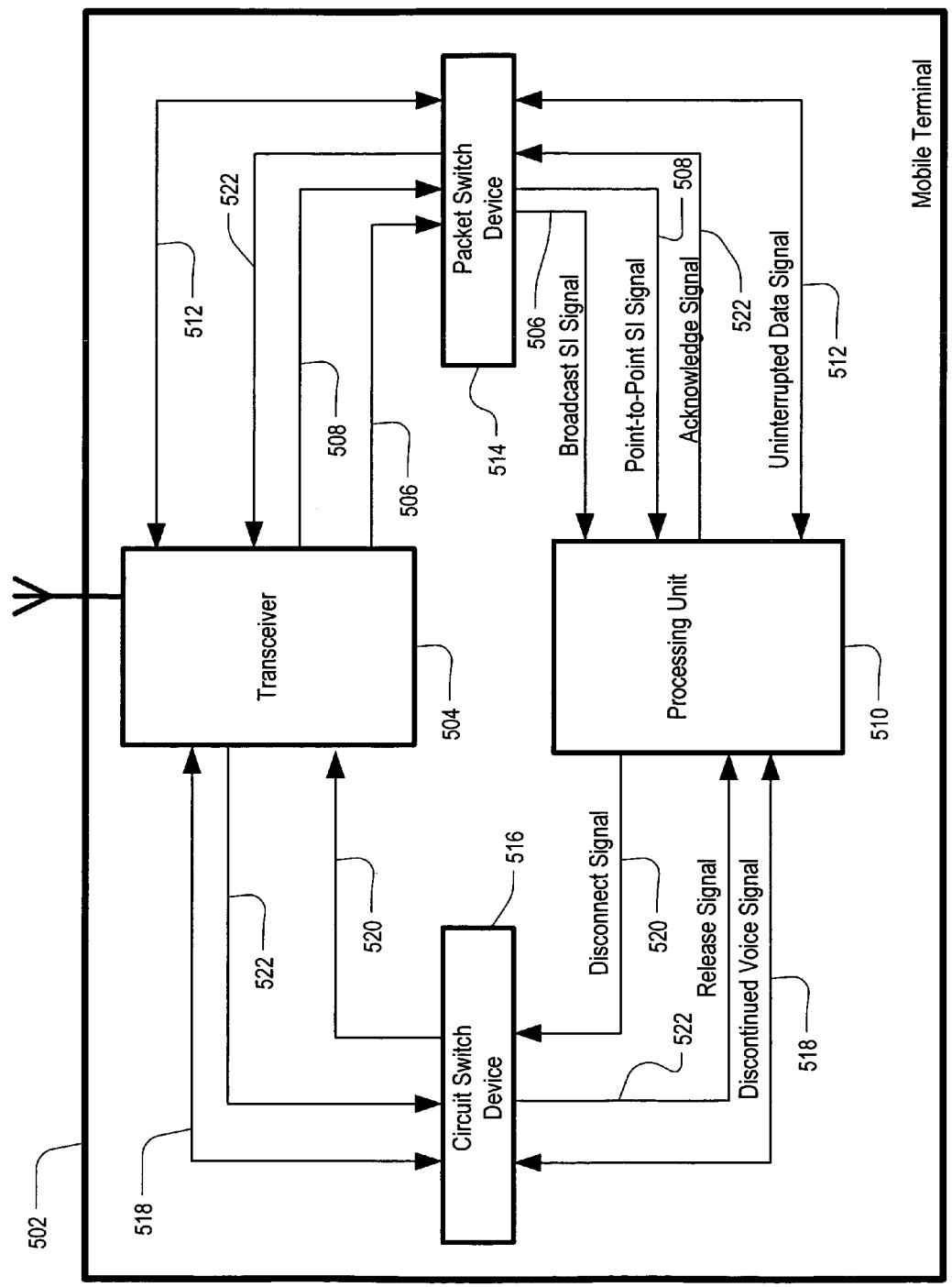
FIG. 5 is a block diagram of a mobile terminal according to the present invention.

Referring now to FIG. 5, this shows a mobile terminal 502 according to an embodiment of the present invention, for transitioning in a wireless communication system from a dual mode wherein a packet switched connection and circuit switched connection are used together, to a single mode wherein packets are transferred. This mobile terminal includes a transceiver 504, for sending toward a processing unit at least one minimum information signal 506, 508 indicative of a portion of minimum information necessary to perform the transition in an uninterrupted manner. The mobile terminal 502 also includes a processing unit 510, responsive to the at least one information signal 506, 508, for employing the information to transition from the dual mode to the single mode in the uninterrupted manner, unless the portion of the minimum information includes less than all of the minimum information. If the portion does include all of the minimum information, then there will be an uninterrupted data signal 512 during the transition from dual mode to single mode. The at least one information signal is broadcast 506 to the mobile terminal on a regular basis, or may be sent to the mobile terminal as needed by the mobile terminal 508, and the latter point-to-point system information (SI) signal 508 may be sent on the contingency that the former signal 506 did not convey all of the minimum information to the mobile terminal.

The mobile terminal 502 further includes a packet switch device 514, for processing and passing the uninterrupted data signal 512 between the processing unit 510 and the transceiver 504, if the at least the portion of the minimum information includes all of the minimum information. The mobile terminal further includes a circuit switch device 516, for processing and passing a voice or other non-bursty signal 518 between the processing unit 510 and the transceiver 504, the voice signal 518 being discontinued while the data signal 512 is uninterrupted.

There are four signals touching the right-hand-side of the processing unit 510 Shown in FIG. 5, and three signals touching the left-hand-side of that processing unit 510. All seven of those signals are, in this embodiment, illustrated in sequence from top to bottom; so, for example, the broadcast system information (SI) signal 506 is received before the disconnect request signal 520 is sent. Likewise, the release signal 522 is not sent until after the acknowledge signal 522 acknowledges receipt of all the minimum information (otherwise the data signal will be interrupted). Thus, this mobile terminal shown in FIG. 5 is capable of performing the method illustrated in FIG. 4.

It is to be understood that all of the present figures, and the accompanying narrative discussions of best mode embodiments, do not purport to be completely rigorous treatments of the method, terminal, and system under consideration. A person skilled in the art will understand that the steps and signals of the present application represent general cause-and-effect relationships that do not exclude intermediate interactions of various types, and will further understand that the various steps and structures described in this application can be implemented by a variety of different combinations of hardware and software which need not be further detailed herein.

What is claimed is:

1. A method in a wireless communication system for a mobile terminal to transition from a dual mode, in which a packet switched connection and circuit switched connection are used together, to a single mode in which packets are transferred, comprising the steps of:

receiving at least minimum system information necessary to perform the transition in an uninterrupted manner, wherein said system information is broadcast to the mobile terminal on a regular basis, and is also sent to the mobile terminal partly or entirely by point-to-point transfer if a piece of said minimum system information is missing, and employing the information to transition from the dual mode to the single mode in the uninterrupted manner.

2. The method of claim 1, wherein the dual mode corresponds to a Class-A mode, and the single mode corresponds to a Class-B or Class-C mode.

3. The method of claim 2, wherein the system information includes a packet system information message that is automatically broadcast to the mobile terminal at regular intervals to furnish updated system information via a packet associated control channel (PACCH).

4. The method of claim 3, wherein the packet system information message is sent before a channel for the circuit switched connection is released.

5. The method of claim 1, further comprising the steps of:

initiating or asking for disconnection of the circuit switched connection before a channel used for the circuit switched connection is released, and obtaining at least some of the information after initiating or asking for the disconnection, but before the channel is released.

6. The method of claim 5, wherein the at least some of the information in the obtaining step is sent to the mobile terminal using a packet serving cell data message, via a packet associated control channel (PACCH).

7. The method of claim 5, further comprising the step of sending an acknowledgment from the mobile terminal that all of the minimum system information was obtained, and wherein the channel is released after the acknowledgment is received.

8. The method of claim 1, further comprising the step of transitioning to the single mode in an interrupted manner, absent an acknowledgment during a certain time period from the mobile terminal that all of the minimum system information was obtained.

9. The method of claim 8, wherein the interrupted manner includes, and the uninterrupted manner excludes, the steps of requesting a channel, having a channel assigned, asking for a packet resource, and obtaining a packet uplink assignment.

10. The method of claim 1, wherein the mobile terminal receives the point-to-point transfer via packet serving cell data after initiating or asking for disconnection of the circuit switched connection, but before release of a channel supporting the connection.

11. The method of claim 5, wherein a packet SI status, packet PSI status, or another message from the mobile terminal includes a field indicating that a location area update or combined routing area update will happen when the circuit switched connection ends and packet and circuit switched resources are released.

12. The method of claim 7, wherein a packet SI status, packet PSI status, or another message from the mobile terminal comprises the acknowledgment.

13. The method of claim 11, wherein the field is a circuit switch procedure pending bit.

14. A computer readable medium encoded with a software data structure sufficient for performing the method of claim 1.

15. A mobile terminal for transitioning in a wireless communication system from a dual mode wherein a packet switched connection and circuit switched connection are used together, to a single mode wherein packets are transferred, comprising:
   a transceiver, for sending toward a processing unit at least one minimum system information signal indicative of at least minimum system information necessary to perform the transition in an uninterrupted manner; and
   the processing unit, responsive to the at least one minimum system information signal, for employing the information to transition from the dual mode to the single mode in the uninterrupted manner,
   wherein said at least one minimum system information signal is broadcast to the mobile terminal on a regular basis, and is also sent to the mobile terminal partly or entirely by point-to-point transfer if a piece of said minimum system information is missing.

16. The mobile terminal of claim 15, further comprising:
   a packet switch device, for processing and passing an uninterrupted data signal between the processing unit and the transceiver; and
   a circuit switch device, for processing and passing a voice signal between the processing unit and the transceiver, the voice signal being discontinued while the data signal is uninterrupted.

17. The mobile terminal of claim 15, wherein the dual mode corresponds to a Class-A mode, and the single mode corresponds to a Class-B or Class-C mode.

18. The mobile terminal of claim 17, wherein the system information includes a packet system information message that is automatically broadcast to the mobile terminal at regular intervals to furnish updated system information via a packet associated control channel (PACCH).

19. The mobile terminal of claim 18, wherein the packet system information message is sent before disconnecting the circuit switched connection.

20. The mobile terminal of claim 19, wherein the processing unit is for providing an acknowledge signal to the transceiver, during a certain time period after providing a disconnect signal requesting disconnection of the circuit switched connection, if the mobile terminal has all of the minimum information.

21. The mobile terminal of claim 20, wherein the transceiver is for providing additional information toward the processing unit contingent on prior absence of the acknowledge signal.

22. The mobile terminal of claim 20, wherein the mobile terminal is for initiating the transition to the single mode in an interrupted manner, absent the acknowledge signal during the certain time period.

23. The mobile terminal of claim 20, wherein the acknowledge signal includes a field indicating that a location area update or combined routing area update will happen when the circuit switched connection ends and packet and circuit switched resources are released.

24. The mobile terminal of claim 23, wherein the field is a circuit switched procedure pending bit.

25. A system for transitioning in a wireless communication system from a dual mode wherein a packet switched connection and circuit switched connection are used together, to a single mode wherein packets are transferred, comprising:
   a base station, for providing at least one minimum system information signal indicative of at least minimum information necessary to perform the transition in an uninterrupted manner; and
   a mobile terminal, responsive to the at least one minimum system information signal, for employing the information to transition from the dual mode to the single mode in the uninterrupted manner,
   wherein said at least one minimum system information signal is broadcast to the mobile terminal on a regular basis, and is also sent to the mobile terminal partly or entirely by point-to-point transfer if a piece of said minimum system information is missing.

26. The system of claim 25, wherein the at least one minimum system information signal includes a periodically updated signal broadcast via a packet associated control channel (PACCH).

27. The method of claim 5, further comprising the step of sending a notification to the mobile terminal, using a channel release message, the notification indicating that the mobile terminal is not allowed to continue in the single mode immediately after the release of the channel.

28. The method of claim 7, further comprising the step of sending a notification to the mobile terminal using a channel release message, the notification indicating that the mobile terminal is allowed to continue in the single mode immediately after the release of the channel.

* * * * *